Oct. 20, 1931.  F. W. GREER  1,828,405
CONFECTION COATING MACHINE
Filed Jan. 10, 1929  3 Sheets-Sheet 1
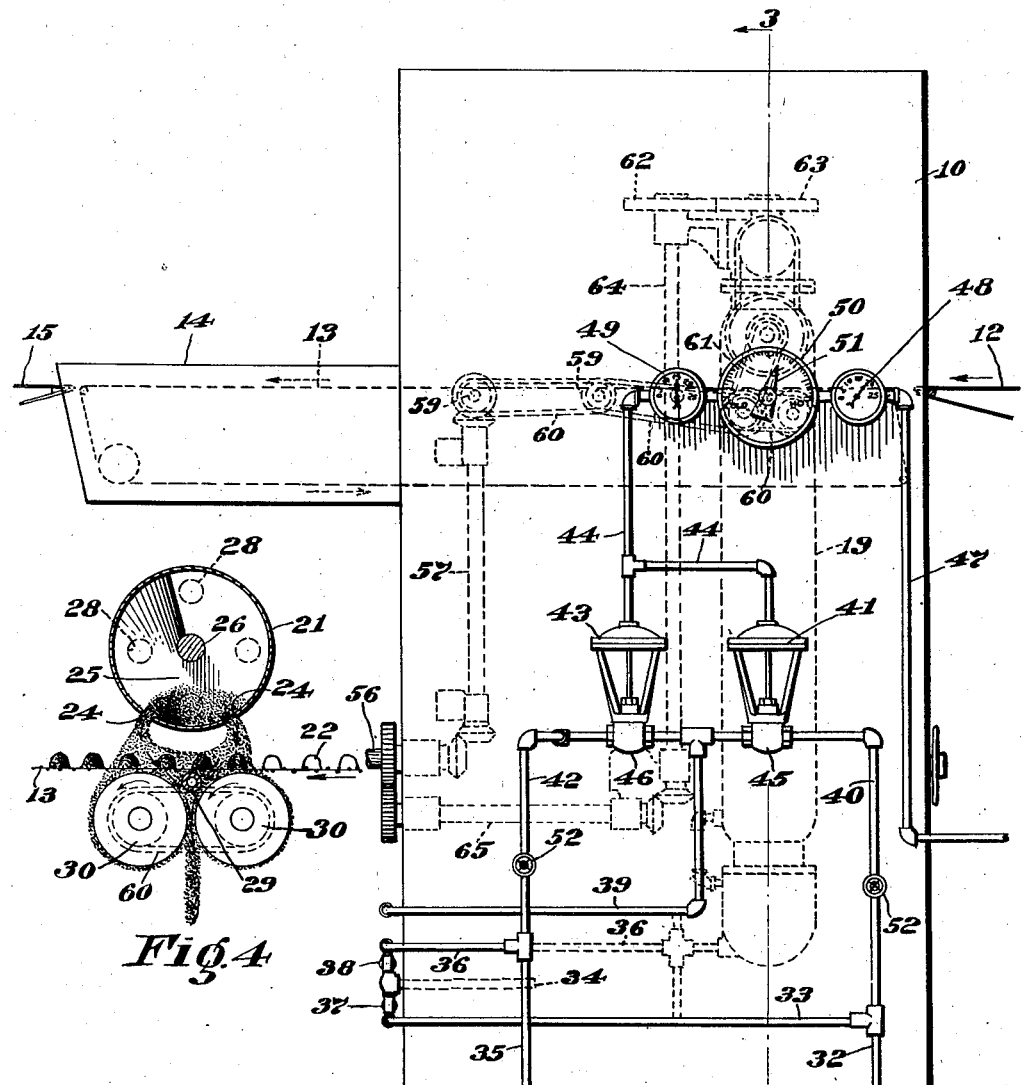
Fig.1
Fig.4
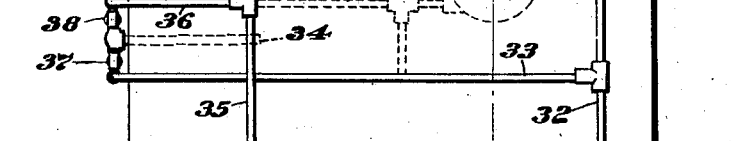
INVENTOR:
Frederick W. Greer,
BY
ATTORNEY

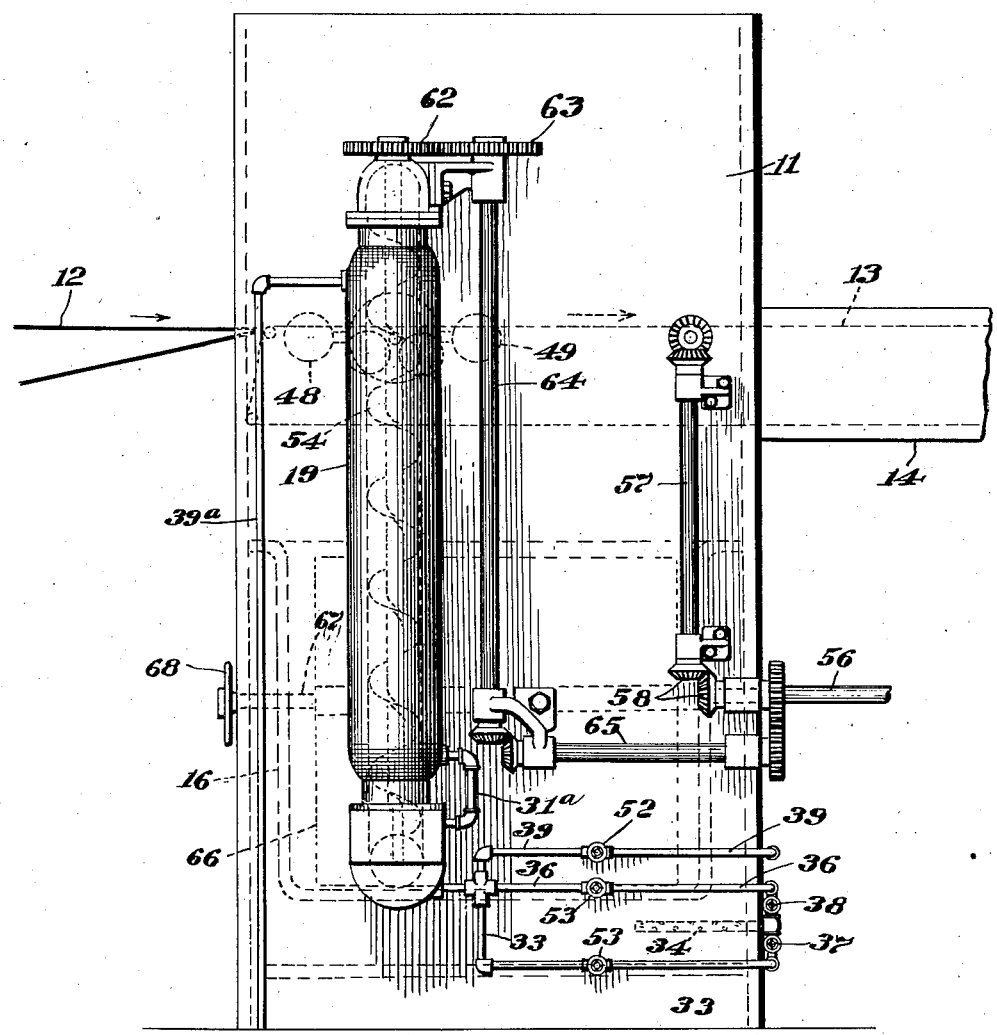

Oct. 20, 1931.   F. W. GREER   1,828,405
CONFECTION COATING MACHINE
Filed Jan. 10, 1929   3 Sheets-Sheet 3

INVENTOR
Frederick W. Greer,
BY
ATTORNEY

Patented Oct. 20, 1931

1,828,405

UNITED STATES PATENT OFFICE

FREDERICK W. GREER, OF CAMBRIDGE, MASSACHUSETTS

CONFECTION COATING MACHINE

Application filed January 10, 1929. Serial No. 331,434.

This invention relates to improvements in coating machines employed to coat candy and other confections.

Confection coating machines are commonly provided with a wire conveyor apron adapted to convey the confections beneath a receptacle constructed to discharge a stream of hot chocolate upon the confections.

It is important that the temperature of the chocolate be accurately controlled, because slight changes in the temperature of the chocolate deposited upon the confections will cause the appearance of the coated confections to vary. In high grade work the temperature at which the chocolate is applied to the confections is not permitted to vary more than one or two degrees.

In many cases it may be desirable to maintain the chocolate in the supply tank beneath the conveyor apron at a slightly different temperature from that at which it is deposited upon the confections; thus making it necessary to provide jacketed means located between the supply tank and coating applying receptacle for regulating the temperature of the chocolate delivered to the confections.

Having this in mind, one of the features of the present invention resides in temperature control means for automatically regulating the temperature of the chocolate delivered to the articles to be coated, and more particularly to temperature control means the sensitive element of which is located at or near the coating applying position; for example, in the stream of the chocolate delivered to the articles to be coated.

When a cooling fluid such as water is supplied to the jacketed conduit located between the supply tank and coating applying receptacle, the cooling effect of the water will cause the chocolate to harden and become deposited upon the walls of the conduit. It is therefore necessary to provide a scraper to scrape the chocolate from the walls of the jacket, and a further feature of the present invention resides in a combined scraper and screw pump mounted in said conduit and adapted to perform the double function of forcing the chocolate through the jacketed conduit and of scraping the walls thereof.

Another feature of the present invention resides in a rotary scraper mounted in the discharge receptacle above the conveyor apron and operable to keep the discharge slot of the receptacle from becoming clogged, and also to keep the receptacle free of deposits.

It has been customary heretofore to pump the hot chocolate from a supply tank into an open pan positioned above the conveyor apron to coat the confections. Difficulty has been experienced, however, in the employment of such construction, due to the formation of air bubbles in the finished coating caused by air being confined in the chocolate in said pan.

This difficulty is entirely overcome in accordance with the present invention by providing a continuous closed conduit between the chocolate supply tank and the discharge receptacle above the conveyor apron so that air is excluded from the chocolate until the chocolate is discharged in the form of a stream upon the articles to be coated.

Other features of the invention and novel combination of parts, in addition to the above, will be hereinafter described in connection with the accompanying drawings which illustrate one good practical form of the invention.

In the drawings,—

Fig. 1 is a side elevation of a confection coating machine embodying the features of the present invention;

Fig. 2 is a side elevation of the opposite side of the machine of Fig. 1;

Fig. 4 is an enlarged vertical sectional view taken on the line 4—4 of Fig. 3.

Figure 3:
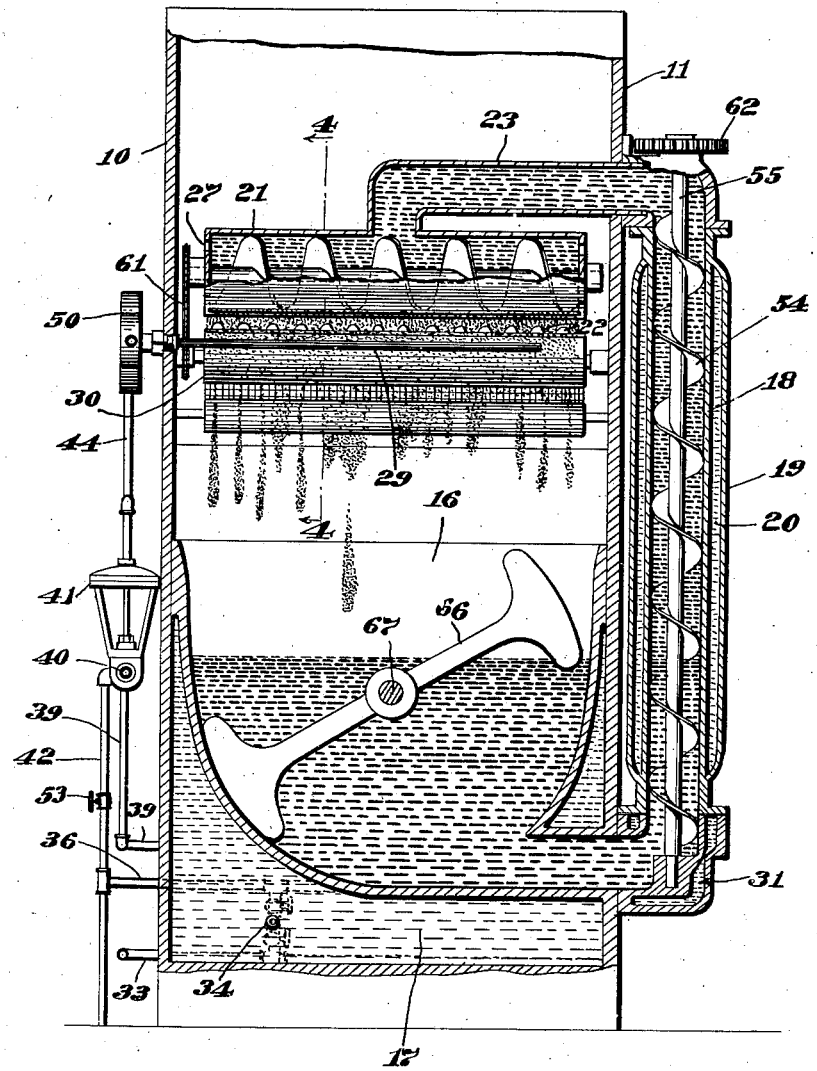
Fig. 3 is a vertical sectional view taken substantially on the line 3—3 of Fig. 1.

The coating machine with which the features of the present invention are associated for the most part may be of usual or well known construction, and as shown comprises a closed casing having the opposite side walls 10 and 11, to which the end walls and the top of the casing are secured. The candy centers, cakes or other articles to be coated are delivered to the coating machine by an endless belt or apron 12, which is positioned to deliver such articles to the upper run of a wire conveyor apron 13 positioned within said closed casing. The wire apron 13 may be of usual construction and serves to advance the articles beneath the coating applying means to be described and entirely through the coating machine and lengthwise of an extension 14 attached to an end wall of the coating machine casing.

The excess chocolate or other coating material deposited upon the confections will drain off the confections as they are advanced by the conceyor apron 13 in the direction indicated by the arrow, and the coated confections, upon reaching the end of the upper run of the conveyor apron 13 are delivered to the traveling belt or the like 15. Within the lower portion of the casing of the coating machine is mounted a supply tank 16 in which the chocolate or other coating material is retained and the excess coating material which drains from the coated confections and the conveyor apron falls into the receptacle 16, as will be apparent from Fig. 3.

It is important that the chocolate or other coating material retained in the supply tank 16 be heated and maintained at a definite predetermined temperature in order to facilitate the delivery of the coating material to the coating applying receptacle at the proper temperature; the tank 16 is therefore shown as provided with a water jacket 17 to which either water or steam may be supplied by means to be described, or if desired a gas burner not shown may be provided beneath the water jacket 17 to help maintain the same at the desired temperature.

The coating material is pumped from the supply tank 16 to a coating applying receptacle mounted above the upper run of the conveyor apron 13 and it is desirable to accurately control the temperature of the coating material as it passes from the supply tank 16 to said coating receptacle. This is accomplished by means of the jacketed conduit 18 having the surrounding wall 19 forming the water receiving space 20 between the walls 18 and 19. The arrangement is such that the temperature of the coating material passing upwardly through the conduit 18 may be accurately controlled by varying the temperature of the water in the surrounding jacket 19. The construction so far described forms no essential part of the present invention but has been briefly set forth in order to make clear the construction and operation of the features of the present invention, which will now be described.

In the coating machines as constructed heretofore it has been customary to employ an open pan supported above the upper run of the conveyor apron 13 to discharge a stream of chocolate or other coating material upon the confections to be coated. It is found, however, that when such open pans are used air is likely to become imprisoned in the coating material and results in the formation of air bubbles in the coating upon the finished goods. This, of course, is objectionable and is prevented, in accordance with the present invention, by substituting for the open type of shower pan employed heretofore a closed receptacle or shower pan 21 which is provided with one or more slots in the under face thereof for delivering the coating material to the confections 22 advanced by the upper run of the apron 13. The coating material is delivered from the jacketed conduit 18 to the receptacle 21 through a pipe 23, the arrangement being such that a continuous closed pipe or conduit is provided for conducting the coating material from the supply tank 16 to the coating applying receptacle 21 and as a result air from the atmosphere is excluded from the coating material until it issues from the discharge slots 24 in the lower portion of the receptacle 21 to fall upon the confections 22. This construction through the exclusion of air from the coating material gives better control of the temperature at which the coating material is delivered to the confections and prevents the formation of bubbles in the coating of the finished goods.

It is important that the lumps or hardened particles within the coating material be prevented from lodging in the slots 24 and interfering with the free passage of the coating material through such slots. This is accomplished, in accordance with the present invention, by giving the receptacle 21 the cylindrical shape shown so that a spiral scraper 25 having a central driving shaft 26 may be rotatably mounted within the receptacle 21. The arrangement is preferably such that the scraper will serve not only to keep the slots 24 from becoming clogged, but will serve also to scrape the side and end walls 27 of the receptacle 21, to prevent the coating material from becoming deposited on such walls. If desired, discharge holes 28 may be formed in one or both of the end walls 27 through which lumps not crushed or broken up by the spiral scraper will be forced by the scraper.

As has been previously stated, it is important that the temperature at which the coating material is delivered to the confections be accurately controlled because when chocolate is applied as a coating to the confections 22 a slight change from a predetermined temperature will modify the appearance of the coated goods. An important feature of the present invention, therefore, resides in a temperature regulator or thermostat for automatically controlling the temperature of the coating material delivered to the receptacle 21 and more particularly to an arrangement in which the regulator bulb or sensitive element 29 of the automatic regulator is located in close proximity to the position where the coating material is applied to the confections 22. In the construction shown the regulator bulb or sensitive element 29 is mounted in the path of the coating material delivered to the confections 22.

In order to insure application of the coating material to the bottoms of the confections 22 it is desirable to provide means below the upper run of the apron 13 adjacent the coating applying position to retard the passage of the coating material through this apron, to thereby cause the coating material to build up at this point sufficiently to insure application of the same to all portions of the confections 22. This is conveniently accomplished by providing the rolls 30 located beneath the receptacle 21 in close proximity to the under face of the upper run of the apron 13, as will be apparent from Fig. 4 and these rolls 30 are preferably driven at a slightly greater speed than the apron 13 to thereby cause the apron to scrape the surfaces of the rotating rolls to keep them free from hardened coating material. The coating material accumulates or builds up in the valley between the rolls 30, as will be apparent from Fig. 4, and in accordance with the present invention the regulator bulb or sensitive element 29 of the temperature regulator is mounted in this valley in spaced relation to the rolls 30 and apron 13 as shown. This arrangement is highly desirable because it locates the regulator bulb in close proximity to the position at which the coating material is applied to the confections 22 and gives excellent control of the temperature at which the coating material is applied to the confections. This arrangement has the further advantage in that since the regulator bulb 29 is disposed in close proximity to the apron 13 and rolls 30 these moving elements will serve to remove from the regulator bulb coating material that may become deposited thereupon.

In order to prevent the parts of the coating machine in which the coating material will accumulate when the machine is standing idle from freezing, it is desirable that these parts be provided with heating jackets, and the supply tank, as above stated, is provided with the water jacket 17 while the conduit 18 is provided with the water jacket 20 and the bend or elbow at the lower end of the conduit 18 which forms a connection between the tank 16 and conduit 18 is preferably provided with a water jacket 31. The water jackets 20 and 31 may be connected by the pipe 31ª, as will be apparent from Fig. 2. In most cases no connection is provided between the main water jacket 17 and the auxiliary water jackets 20 and 31.

In order to secure the desired control of the temperature of the water in the various jackets pipe connections are provided for admitting cold water,—that is water from the ordinary supply system, and steam to the different water jackets. This is accomplished in the construction shown by providing the water supply pipe 32 having a laterally extending pipe 33 leading to a discharge nozzle 34 that projects into the water jacket 17, and steam is supplied to this discharge nozzle 34 from a steam pipe 35 having a laterally extending pipe 36 leading to the discharge nozzle 34. Hand valves 37 and 38 are preferably provided for regulating the flow of steam and cold water to the nozzle 34.

In accordance with the present invention the temperature of the water in the jackets 20 and 31 is regulated automatically and this is accomplished in the construction shown by providing a pipe 39 leading to the water jacket 31 and adapted to deliver water to this jacket and the jacket 20 at the desired temperature. To accomplish this the mount of cold water supplied to the pipe 39 from the water pipe 32 through a connection 40 is controlled by a diaphragm valve 41, and the amount of steam supplied to the pipe 39 through the connection 42 is controlled by the diaphragm valve 43.

The valve 41 is a direct action diaphragm valve and the valve 43 is an indirect action diaphragm valve of well known construction which may be operated by compressed air supplied by the pipe 44. The variation of the air pressure upon the diaphragms of the valves 41 and 43 will shift the position of the plungers in the valves 45 and 46 to thereby regulate the amount of water and steam supplied to the water jacket through the pipe 39.

The sensitive element or regulator bulb 29 of the temperature regulator may operate in a well known manner to control the amount of air supplied to the pipe 44 from a supply pipe 47 which may lead from any suitable source of compressed air. The pressure of the air within the pipe 47 is indicated by a pressure gauge 48 and the pressure of the air within the pipe 44 is indicated by a pressure gauge 49. The air controlled valve mechanism of the regulator bulb 29 is preferably adjustable to secure the desired temperature control and to this end is provided with a graduated disk 50 having a pointer 51 adapted to be manually adjusted to secure the desired temperature control of the regulator. Should it be desirable to manually vary the temperature of the water in the water jacket 20 this may be accomplished by closing the hand valves 52 and opening the valves 53 provided upon the water and steam pipes respectively. It will be seen from the above description of the automatic temperature regulator that the temperature at which the coating material is delivered to the confections 22 will be accurately controlled by the sensitive element 29 located in the path of the coating material discharged from the receptacle 21. As water is forced into the water jackets 20 from the pipe 39 it will force water out of the upper portion of the jacket 20 through the discharge pipe 39a.

If the temperature of the water in the jacket 20 is reduced below the melting point of the coating material the coating material will harden upon the walls of the conduit 18 and if this is not prevented will entirely close the passage within the conduit. This is prevented, in accordance with the present invention, by mounting in the conduit 18 a spiral scraper 54 having the central driving shaft 55, the construction being such that the spiral scraper will serve to scrape the walls of the conduit to keep them free from deposits and will also serve as a pump to force the coating material from the supply tank 16 to the discharge receptacle 21.

The operating parts of the coating machine described may be driven from the main power shaft 56 adapted to drive an upright shaft 57 through the bevel gears 58. The shaft 57 is provided at its upper end with a bevel gear adapted to drive one of the rollers 59 arranged to help support the upper run of the apron 13 and the rolls 30 above mentioned are driven in the direction indicated in Fig. 4 by driving chains 60. The scraper 25 within the receptacle 21 may be driven by a chain 61 from the driving shafts for one of the rolls 30.

The combined pump and scraper 54 within the jacketed conduit 18 is driven by a gear 62 at the upper end of the shaft 55 which gear meshes with a gear 63 at the upper end of the shaft 64 which is driven from the power shaft 56 by the horizontally extending shaft 65. If it is desired to increase or decrease the capacity of the screw pump 54 this may be done by simply varying the size of the gears 62, 63 to change the speed of the screw pump with respect to the other operating parts of the coating machine. Within the supply tank 16 may be mounted the usual stirrer 66 having the central shaft 67 at one end of which is provided a driving gear 68 which may be driven from any suitable means not shown.

It will be seen from the foregoing that the receptacle 21 for depositing the coating material upon the confection is completely closed, except for the material discharge slot or slots 24 and the relatively small end apertures 27, and that the feed connections between the material supply tank 16 and closed receptacle 21 are such that the coating material may be forced into the receptacle 21 under different pressures by varying the speed of the screw pump 54. As a result of this construction the rate at which the stream of material is discharged from the slot 24 may be regulated by varying the speed of the screw pump, without the necessity of varying the size of the feed slot.

What is claimed is:
1. In a coating machine, in combination, a conveyor apron, a coating supply tank, a tubular receptacle above said apron and provided with an end wall having a discharge opening and having a slot in its lower side for depositing the coating material upon articles carried by the apron, a spiral scraper mounted in said receptacle, and means for rotating the scraper to cause it to scrape the walls of the receptacle and to force lumps of the coating material through the opening in said end wall.

2. In a coating machine, in combination, a conveyor apron, a coating supply tank, a receptacle supported above and transversely of the apron and provided with an opening for depositing the coating material upon articles carried by the apron, means for feeding the coating material from the tank to said receptacle, and temperature controlled means for automatically regulating the temperature of the coating material, including a thermostat the sensitive element of which is located beneath the conveyor apron in the path of the coating material discharged from said receptacle.

3. In a coating machine, in combination, a conveyor apron, a coating supply tank, a receptacle above the apron and provided with an opening for depositing the coating material upon articles carried by the apron, means for feeding the coating material from the tank to said receptacle, means below said apron and adapted to confine the coating material sufficiently to effect the coating of the bottoms of said articles, and temperature control means for automatically regulating the temperature of the coating material, including a thermostat the sensitive element of which is supported below the conveyor apron in said confined coating material.

4. In a coating machine, in combination, a conveyor apron, a coating supply tank, a receptacle above the apron and provided with an opening for depositing the coating material upon articles carried by the apron, means for feeding the coating material from the tank to the receptacle, rolls positioned below said apron to apply the coating material to the bottoms of said articles, and temperature control means for automatically regulating the temperature of the coating material, including a thermostat the sensitive element of which is supported in the valley between said rolls.

5. In a coating machine, in combination, a conveyor apron, a coating supply tank, a receptacle above the apron and provided with an opening for depositing the coating material upon articles carried by the apron, means for feeding the coating material from the tank to the receptacle, and temperature control means for automatically regulating the temperature of the coating material, including a thermostat the sensitive element of which is supported below said apron in the path of the coating material discharged from the receptacle and positioned sufficiently close to the apron to cause the latter to scrape deposited coating material from said element.

6. In a coating machine, in combination, a conveyor apron, a coating supply tank, a receptacle above the apron and provided with an opening for depositing the coating material upon articles carried by the apron, means for feeding the coating material from the tank to the receptacle, power driven rolls positioned below said apron to apply the coating material to the bottoms of said articles, and temperature control means for automatically regulating the temperature of the coating materials, including a thermostat the sensitive element of which is supported between said rolls and apron in position to cause the rolls and apron to remove deposited coating material from said element.

7. In a coating machine, in combination, a conveyor apron, a coating supply tank, a cylindrical receptacle having side and end walls and supported above and transversely of the apron and provided with a slot for depositing the coating material upon articles carried by the apron, means for supplying coating material from the tank to said receptacle, a revolving scraper mounted in the receptacle to scrape the side and end walls thereof and the discharge slot to keep these parts free from hardened deposits and lumps, and means for driving the scraper.

8. In a coating machine, in combination, a conveyor apron, a coating supply tank, a slotted shower pan supported above and transversely of the apron for depositing coating material upon articles carried by the apron, means for feeding the coating material from the tank to said shower pan, and temperature controlled means for automatically regulating the temperature of the coating material, including a thermostat the sensitive element of which is located beneath the shower pan in the path of the material discharged therefrom.

In testimony whereof, I have signed my name to this specification.

FREDERICK W. GREER.